United States Patent
Rodriguez et al.

(10) Patent No.: US 12,124,571 B2
(45) Date of Patent: Oct. 22, 2024

(54) INTRUSION DETECTION MECHANISM FOR SECURITY SENSITIVE PCB COMPONENTS

(71) Applicant: Microsoft Technology Licensing, LLC, Redmond, WA (US)

(72) Inventors: Benito Joseph Rodriguez, Redmond, WA (US); Nisha Susan John, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 17/590,037

(22) Filed: Feb. 1, 2022

(65) Prior Publication Data
US 2023/0244784 A1 Aug. 3, 2023

(51) Int. Cl.
*G06F 21/55* (2013.01)
*G06F 21/75* (2013.01)

(52) U.S. Cl.
CPC ............ *G06F 21/552* (2013.01); *G06F 21/75* (2013.01); *G06F 2221/034* (2013.01)

(58) Field of Classification Search
None
See application file for complete search history.

(56) References Cited

U.S. PATENT DOCUMENTS

| | | |
|---|---|---|
| 6,191,503 B1 | 2/2001 | Kitten et al. |
| 9,658,606 B2 | 5/2017 | Huang |
| 10,496,854 B1 | 12/2019 | Lillestolen et al. |
| 2002/0046342 A1* | 4/2002 | Elteto ................ G06F 21/6245 713/185 |
| 2014/0041060 A1 | 2/2014 | Selwood et al. |
| 2017/0093198 A1* | 3/2017 | Graham ................. H01F 38/14 |
| 2017/0176530 A1* | 6/2017 | Cottrell ............ G01R 31/31719 |
| 2018/0060613 A1 | 3/2018 | Breed et al. |
| 2018/0120910 A1* | 5/2018 | Farkas ..................... G06F 1/26 |
| 2019/0095662 A1* | 3/2019 | Wilding ............. G06K 7/10366 |

(Continued)

FOREIGN PATENT DOCUMENTS

| | | |
|---|---|---|
| CN | 113434915 A | 9/2021 |
| TW | 201516749 A | 5/2015 |
| WO | 2013042108 A1 | 3/2013 |

OTHER PUBLICATIONS

"Pull-up Resistors", Retrieved from: https://web.archive.org/web/20210930022448/https://learn.sparkfun.com/tutorials/pull-up-resistors/all, Sep. 30, 2021, 4 Pages.

(Continued)

*Primary Examiner* — Scott B Christensen
(74) *Attorney, Agent, or Firm* — Holzer Patel Drennan (57) ABSTRACT

A system for detecting access to a security sensitive component on an electronic device includes a PCB-mounted connector that provides read/write access to a security sensitive component on the PCB. The system further includes a connector cap that mates with at least a portion of the connector and that includes circuitry that facilitates current flow across at least a portion of the PCB-mounted connector when the connector cap is mated with the PCB-mounted connector, When removed from the PCB-mounted connector, the current flow is disrupted. The system further includes an intrusion detection controller that monitors a voltage at a sampling point adjacent to detect removal of the connector cap and to generate an intrusion logfile entry in response.

17 Claims, 6 Drawing Sheets

(56) References Cited

U.S. PATENT DOCUMENTS

2020/0285750 A1    9/2020  Jaeger et al.
2021/0225159 A1    7/2021  Grobelny et al.

OTHER PUBLICATIONS

"International Search Report and Written Opinion Issued in PCT Application No. PCT/US22/050810", Mailed Date: Mar. 13, 2023, 13 Pages.

"Dell PowerEdge C4130 Owner's Manual", Retrieved From: https://dl.dell.com/topicspdf/poweredge-c4130_owners-manual_en-us.pdf, Jul. 28, 2021, 216 Pages.

* cited by examiner

View A

View B

View C

INTRUSION DETECTION MECHANISM FOR SECURITY SENSITIVE PCB COMPONENTS

BACKGROUND

Connectors may be used to electrically interface with various security sensitive components on a printed circuit board (PCB), both in-the-field and in pre-release testing scenarios. For example, a connector may be designed to mount to a PCB and couple to leads of a security sensitive component. Pins on the connector can then be used to connect the security sensitive component (e.g., memory chip, microprocessor) to a target processor, whether the target processor is on a motherboard that is part of the same device as the security sensitive component or within an emulator or debugging tool that is separate from the device.

One example of such a connector is a debug header that is used to program and debug an integrated circuit (IC) before the IC is released in a product. Another example of a connector is a flash memory socket that physically receives and mates with a flash chip on the PCB. Any PCB-mountable component that provides read/write access to a security sensitive component can present a security risk if included in the final product released (e.g., deployed in a datacenter). This security risk arises from the fact that the connector may serve to provide a malicious party with opportunistic access to the security sensitive component.

SUMMARY

An intrusion detection system for detecting access to a security sensitive component on a printed circuit board (PCB) includes a PCB-mounted connector and a connector cap. The PCB-mounted connector provides an electrical interface for accessing the security sensitive component, and the connector cap mates with the PCB-mounted connector to prevent access to the electrical interface. The connector cap includes circuitry that facilitates current flow through the connector cap and across at least a portion of the PCB-mounted connector when the connector cap is mated with the PCB-mounted connector. When the connector cap is removed from the PCB-mounted connector, the current flow through the connector cap is disrupted and a voltage drop is detectable at a sampling point. The system further includes an intrusion detection controller that monitors the voltage at the sampling point and that generates an intrusion logfile entry in response to detecting a voltage drop at the sampling point.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

In printed circuit board (PCB) development, debug headers are used to program firmware and provide debug access to components on the PCB. A debug header is a circuit board that allows an emulator or debugger to debug code for a specific device, such as a microcontroller or memory chip. The debug header includes a number of pins for that provide electrical connectivity to debug ports (leads) on the device being debugged. Through the pins, the debug header couples the device being debugged or programmed to the debugging or programming tool, either directly or through an adapter.

As debug headers allow access to components and firmware, they present a security concern. A debug header could, for example, provide a malicious actor with opportunistic access to components storing firmware on which malware could be installed to either harm the device or components or data accessible through the device. To mitigate the ease of acquiring physical access to security sensitive components, debug headers are typically removed from PCBs before the associated products are deployed into the field. Tech support teams that sustain hardware released into the field often need to access debug ports in order to address hardware issues that are observed in the field. In these scenarios, debug teams reattach the previously-removed debug headers by manual soldering operations. This is time consuming and can be difficult, particularly if the debug header has small features that are difficult to solder by hand.

The herein disclosed technology provides a security solution that mitigates security concerns associated with debug headers, potentially providing manufacturing and debugging teams with the option of safely leaving debug headers in place on PCBs even after the associated devices are released into the field. The security solution includes an intrusion detection mechanism that detects and logs instances of physical access to a select connector protected by the intrusion detection mechanism, where the connector is a component that provides read/write access to a security sensitive component on the PCB. As used herein, the term "security sensitive component" refers to a data storing hardware component and/or a logic executing hardware component. Examples of data-storing components include both volatile memory (e.g., static random access memory (SRAM), dynamic random access memory (DRAM)) and non-volatile memory (e.g., read only memory (ROM), flash) while examples of logic executing components include integrated circuit (IC) chips with microprocessors (e.g., circuit controllers, system-on-chips (SOCs), field programmable gate arrays (FPGAs)).

In the following description, debug headers are offered as one example medium for integration of the proposed intrusion detection mechanism; however, the disclosed intrusion detection mechanism is suitable for incorporation into a variety of types of other PCB-mounted connectors that provide access to security sensitive (e.g., data-storing or logic executing) hardware components.

According to one implementation, the intrusion detection mechanism includes control circuitry that detects when a user has accessed an electrical interface of a select security sensitive component protected by the intrusion detection mechanism. In some implementations, the control circuitry is configured to automatically record individual instances of detected access, such as by logging a timestamp in a logfile using a reserve power supply of a device including the security sensitive component.

According to another implementation, the intrusion detection mechanism includes a connector cap that mates with a portion of the connector to prevent physical access to an electrical interface of a security sensitive component that is accessible through the connector. The connector cap includes electrical components that complete an electrical path across at least a portion of the connector when the connector is mated with the connector cap. Removal of the connector cap from the connector disrupts an electrical signal across the electrical path and causes a detectable voltage drop at a select sampling location. If monitored and logged, this drop in voltage at the sampling point can serve to effectively flag potentially nefarious access to the electrical interface of the security sensitive component. For example, a processor coupled to the sampling location can be configured to self-generate an intrusion logfile entry in a persistent memory location when the connector cap is removed. The intrusion logfile entry may, for example, serve to inform a debugging team that a security sensitive component has been tampered with.

The disclosed intrusion detection mechanism may be employed in a variety of uses cases to prevent mishandling of devices with potentially compromised security sensitive components. If, for example, a debugging team receives a device with an intrusion detection logfile indicating that a particular security sensitive component on the PCB has been accessed, the device may be disqualified from re-entering a production environment and/or subjected to more cautious handling techniques (e.g., because it can be reasonably suspected that the security sensitive component has been tampered with and is therefore potentially corrupted by malware). Timestamp information recorded in an intrusion logfile may provide additional information helpful in determining whether a logged access instance was likely unauthorized or malicious. If, for example, an intrusion logfile entry indicates that a data chip was physically accessed at an unexpected time, such as when the device was in transit between facilities, this may suffice to flag a potential corruption of firmware on the chip and/or warrant special handling operations that ensure, for example, the device is not plugged into a larger system that could be modified or wiped by the corrupted firmware.

Figure 1:
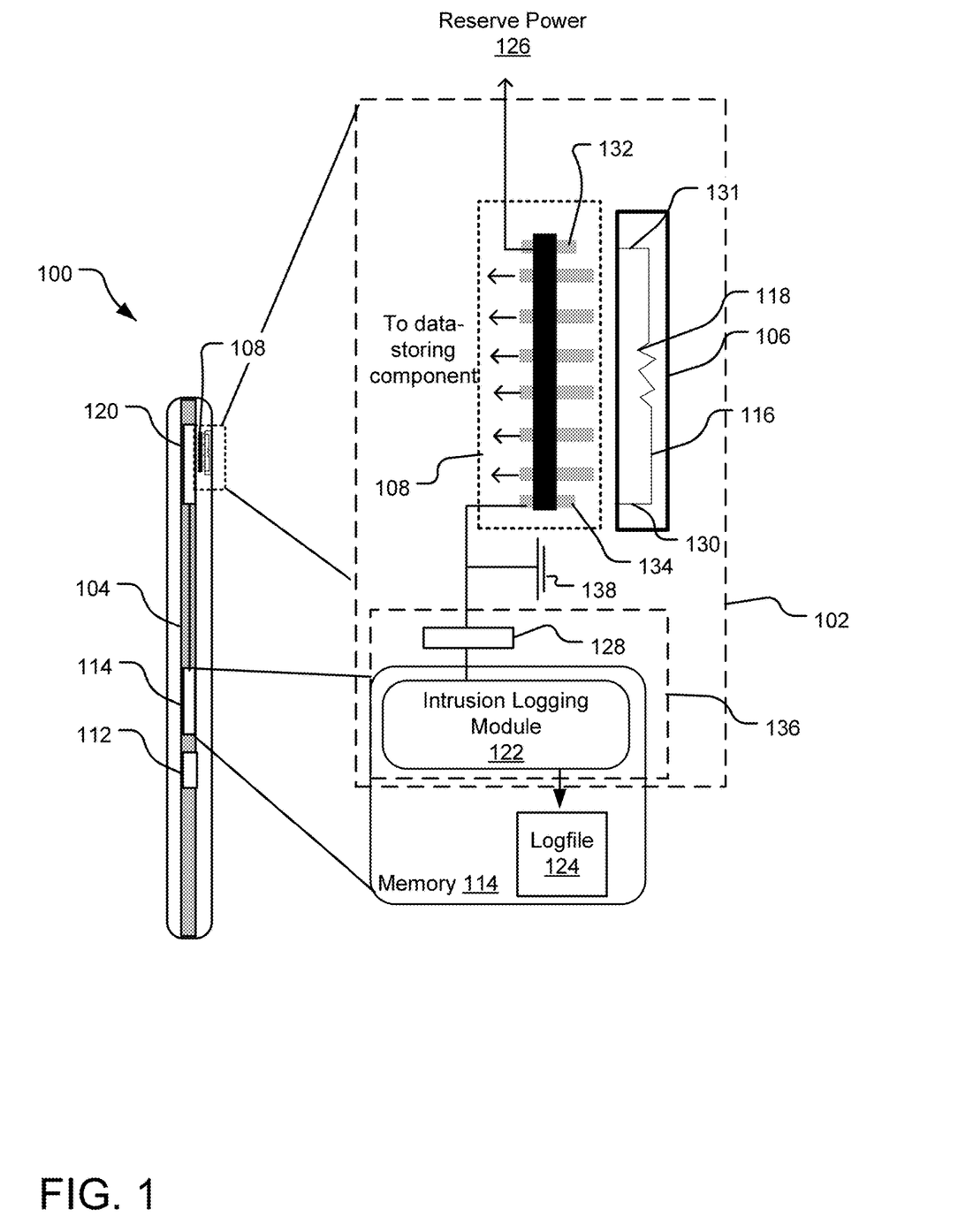
FIG. 1 illustrates an electronic device including an example intrusion detection mechanism for detecting access to an electrical interface of a security sensitive component on a printed circuit board (PCB).

FIG. 1 illustrates an electronic device 100 including an example intrusion detection mechanism 102 for detecting access to an electrical interface of a security sensitive component 120 on a printed circuit board (PCB) 104. In FIG. 1, the intrusion detection mechanism 102 includes certain features of a connector 108, a connector cap 106, an intrusion detection controller 136 (further including detection circuitry 128 and an intrusion logging module 122, which includes computer-executable instructions stored in memory 114). The electronic device 100 is shown to be a phone or tablet but may, in different implementations, assume a variety of forms including that of any electronic device with a processor 112 for executing instructions stored in the memory 114 including personal electronic devices, enterprise/commercial processing devices (e.g., servers), datacenter storage device, etc.

In FIG. 1, the memory 114 represents non-volatile memory and stores at least intrusion logging module 122 that performs actions for logging instances of detected access to the security sensitive component 120. The security sensitive component 120 is a component capable of storing at least some data that may be considered security sensitive in the sense that the compromise or corruption of such data presents a concerning risk to the data owner, to the device itself (e.g., to the integrity or safety of the device), or to other devices and/or data sources that are electrically coupled to or otherwise accessible through the security sensitive component 120. In various implementations, the security sensitive component 120 may assume a variety of forms including that of a microprocessor, memory chip, standard physical bus with a controller (I2C, PCIE, USB), etc.

The security sensitive component 120 is read/write accessible through a connector 108, which is a PCB-mounted component that provides an electrical interface for coupling a target processing device to the security sensitive component 120. For example, the target processing device may be an emulator or debugging tool that is separate from the electronic device 100 (and not pictured in FIG. 1). In other implementations, the target processing device is a processor internal to the electronic device 100, such as the processor 112. For example, the connector 108 is a PCB-mounted memory socket (see, e.g., flash memory socket 401 of FIG. 4) that removably couples with a memory chip to allow the electronic device 100 to read and write to the memory chip.

In the example of FIG. 1 the connector 108 is a debug header with a pin assortment specifically designed to facilitate programming and debug functions on the security sensitive component 120. For example, a debug tool or emulator may be coupled to outward-facing ends of the pins on the connector 108 to program and/or to debug the security sensitive component 120.

The connector cap 106 of the intrusion detection mechanism 102 includes an electrical pathway 116 that extends along a length of the connector cap 106 with leads exposed on a surface of the connector cap 106. The connector cap 106 is designed to mate with the connector 108 such that the electrical pathway 116 completes an electrical circuit between a reserve power source 126 (e.g., a battery) and a ground connection 138 when the connector cap 106 is in place on the connector 108. In the mated configuration, a first end portion 131 of the connector cap 106 is electrically coupled to the reserve power source 126 and a second end portion 130 of the connector cap 106 is electrically coupled to the detection circuitry 128.

In different implementations, the connections between the connector cap 106, the detection circuitry 128, and the reserve power source 126 may be facilitated by the connector 108 or by components external to the connector 108. In FIG. 1, these connections are facilitated by extra pins (e.g., intrusion pins 132, 134) that are included in the connector 108. When the connector cap 106 is mated with the connector 108, current flows through the electrical pathway 116 and a voltage provided by the reserve power source 126 is detectable at the detection circuitry 128. The electrical pathway 116 may include one or more resistors (e.g., a resistor 118) to reduce the amount of current that flows through the electrical pathway 116 and thereby reduce the amount of power consumed by the intrusion detection mechanism 102.

The connector cap 106 can be removed to provide physical read/write access to the security sensitive component 120 through the connector 108. Removal of the connector cap 106 from the connector 108 disrupts the flow of current between the reserve power source 126 and the detection circuitry 128. Consequently, the detection circuitry 128 detects a drop of voltage, and the intrusion logger 122 creates an entry in an intrusion logfile 124 that includes at least a timestamp corresponding to the time of removal for the connector cap 106.

According to one implementation, the intrusion detection controller 136 is supported by the reserve power 126 or other persistent power such that the intrusion detection controller 136 receives power even if the PCB 104 is off. Resistance within the electrical pathway 116 may be designed such that the intrusion detection mechanism 102 consumes an exceptionally small amount of power. For example, the current flowing through the electrical pathway 116 in the connector cap 106 may be on the order of 500 nA.

Figure 2:
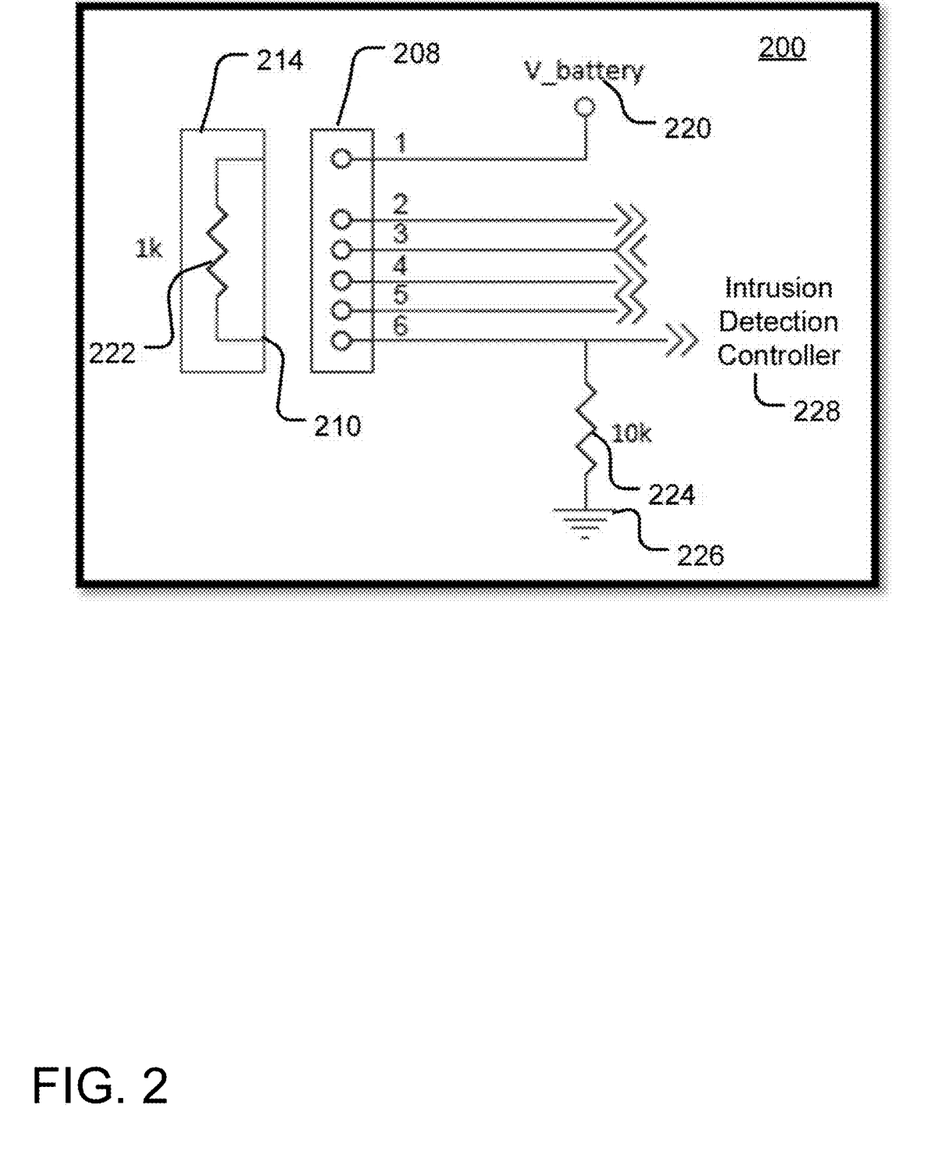
FIG. 2 illustrates a circuit diagram for another example intrusion detection mechanism for detecting physical access to a security sensitive PCB component.

FIG. 2 illustrates a circuit diagram for another example intrusion detection mechanism 200 usable to detect access to a security sensitive PCB-mounted component. The intrusion detection mechanism 200 includes a connector cap 214 that is adapted to mate with a connector 208. In FIG. 2, the connector 208 is a debug header that is usable to couple an external processor, such as an emulator or debug tool, to a security sensitive component (not shown) attached to a PCB within an electronic device. The connector 208 includes a number of application pins (numbered 2, 3, 4, 5) that are used for programming and/or debugging of the security sensitive component. In addition to the application pins (2, 3, 4, 5), the connector 208 also includes intrusion pins (numbered 1 and 6) that electrically couple with leads (e.g., a lead 210) within the connector cap 214 to complete an electrical pathway between a battery 220 and intrusion detection controller 228.

When the connector cap 214 is mated with the pins (1 and 6) on the connector 208, a voltage of the battery 220 is connected to a first one of the two intrusion pins (1). A strong pull resistor 222 provides a weak resistance, such as 1 k, in an electrical pathway connecting the first intrusion pin (1) to the second intrusion pin (6). Another resistor 224 provides a weak resistance to ground 226, creating a voltage divider functionally ensuring that a voltage level on the second intrusion detection pin (6) is at or close to the voltage level on the first intrusion pin (1) when the connector cap 214 is mated with the connector 208.

Intrusion detection controller 228 monitors the voltage on the second intrusion pin (6). When the connector cap 214 is removed, the voltage level detected by the intrusion detection controller 228 drops to zero. In one implementation, the intrusion detection controller 228 includes both software and hardware components. The hardware components detect a change in the voltage at pin 6 and the software components are executed by a microprocessor to generate an event log responsive to the detected voltage change.

In the illustrated implementation, the intrusion detection mechanism 200 is designed to be used multiple times as the connector cap 214 can be repeatedly removed and replaced. In another implementation, however, the electrical pathway in the connector cap 214 is designed to be permanently broken when the connector cap 214 is removed from the connector 208. For example, a wire in the connector cap 214 may be designed to break when the cap is removed. In devices integrating this concept, the existence of the broken wire in the connector cap 214 may alone serve as evidence that the security sensitive component was tampered with or accessed. Consequently, these systems may or may not additionally include the intrusion detection controller 228 or any other mechanism for logging intrusion events.

Figure 3A:
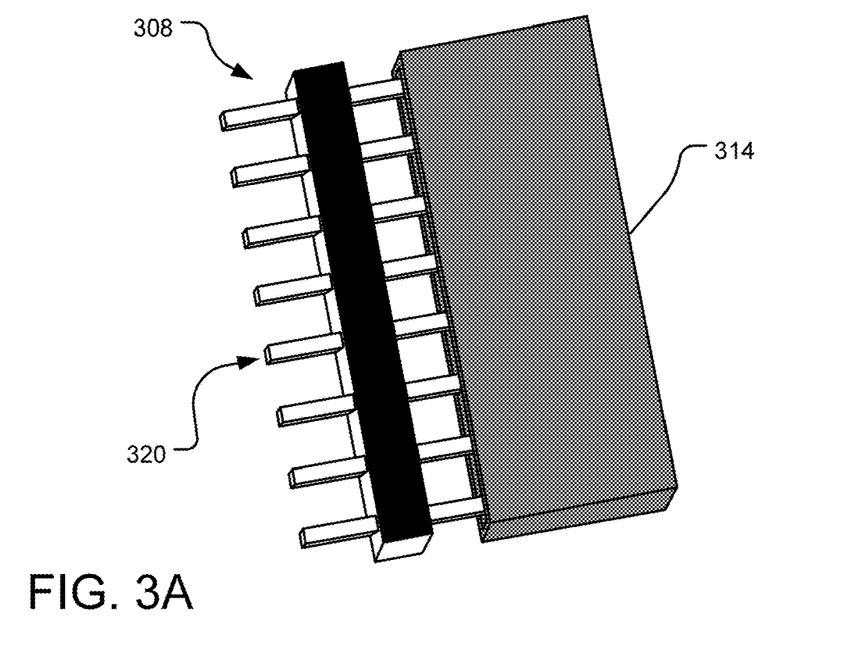
FIG. 3A illustrate aspects of another example intrusion mechanism including a connector and connector cap, which are shown in a mated configuration.
Figure 3B:
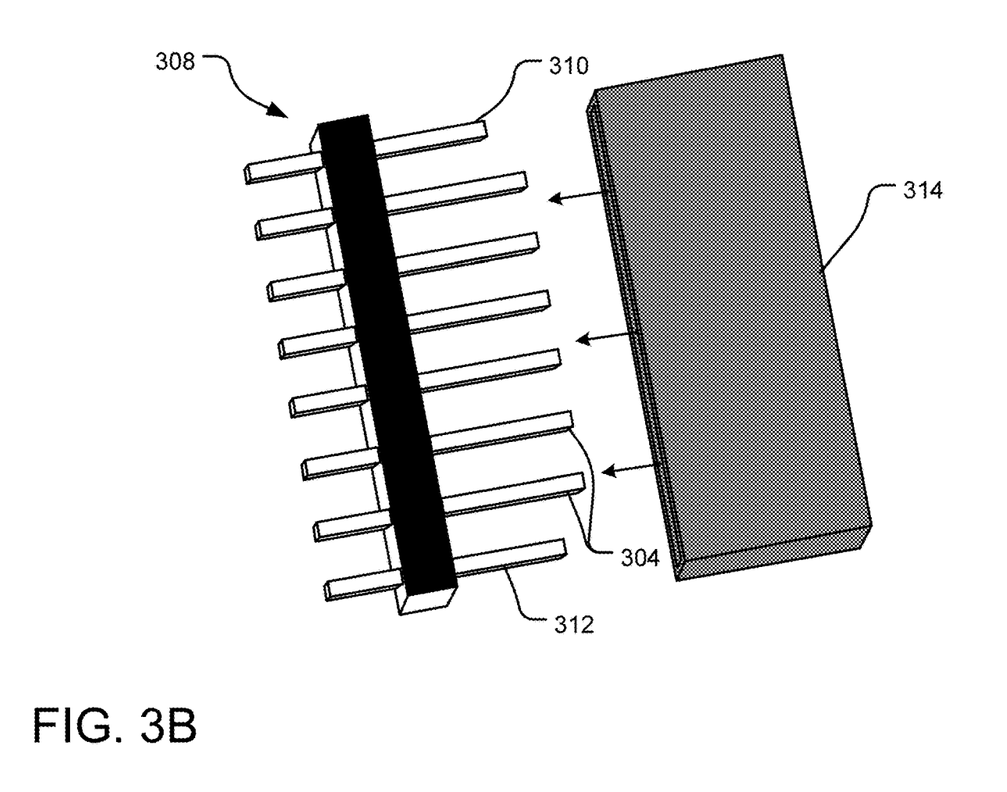
FIG. 3B illustrates the connector and connector cap of FIG. 3A in an unmated configuration.

FIG. 3A illustrate aspects of another example intrusion mechanism including a connector 308 and connector cap 314 in a mated configuration. FIG. 3B illustrates the connector 308 and connector cap 314 in an unmated configuration. The connector 308 and connector cap 314 may include features for implementing the intrusion detection mechanisms described above with respect to FIGS. 1 and 2. The connector 308 includes two intrusion pins 310, 312 that are positioned on opposite ends of a line of application pins (e.g., application pins 304). As shown in FIG. 3B, the intrusion pins 310, 312 are shorter than the application pins.

When in the mated configuration of FIG. 3A, a cavity within the connector cap 314 receives all of the application pins 304 and the intrusion pins 310, 312. Within the cavity, the intrusion pins 310, 312 each electrically couple to opposite ends of an electrical pathway (not shown), such the electrical pathways in the connector caps described with respect to FIG. 1 and FIG. 2.

In an example use scenario, the connector 308 is mounted to a PCB (not shown) such that the application pins 304 provide read/write access to a security sensitive component on the PCB. Traces on the PCB connect a first a PCB-facing end 320 of one of the intrusion pins 310, 312 to a power source (not shown) and a PCB-facing end of a second one of two intrusion pins 310, 312 to a ground connection (not shown). Consequently, when the connector cap 314 is mated with the connector 308, current flows from the power source and along an electrical pathway in the connector cap 314 between the two intrusion pins 310, 312 when in route to the ground connection. As the connector cap 314 is removed (pulled away from) the connector 308 (as shown in FIG. 3B), the electrical pathway in the connector cap 314 is decoupled from the intrusion pins 310, 312, disrupting the flow of current between the power source and ground connection. When this happens, the voltage drops to zero on the select intrusion pin that is coupled to the ground connection (either 310 or 312). This voltage drop is detectable and can be used as a trigger for generating an intrusion logfile entry, as described with respect to FIGS. 1 and 2 above.

Using intrusion pins that are shorter than the application pins in the connector 308 (as shown) may be beneficial because it ensures that the electrical connection between the intrusion pins 310, 312 is shorted out as the connector cap 314 is removed at a time before the application pins are substantially exposed. If, therefore, a malicious actor tried to access the application pins without fully removing the connector cap 314, these efforts would still result in the shorting of the circuit between the intrusion pins 310, 312 and the logging of the intrusion event in a logfile.

In other implementations, the connector 308 and connector cap 314 assume forms different than that shown in FIG. 3A-3B. The use of intrusion pins 310, 312 in the connector 308 is not limited to pin count or other features of the connector. For example, connectors such as USB, video, RJ45, serial, etc. are all used in a PCB interface to provide access to security sensitive components (e.g., controllers with firmware and/or data storage). Any of these and other common industry PCB-mountable connectors could be modified to include additional pins for intrusion detection and to mate with a connector cover such that the connector cover prevents access to application pins but connects the intrusion pins to one another via a resistor.

Figure 4:
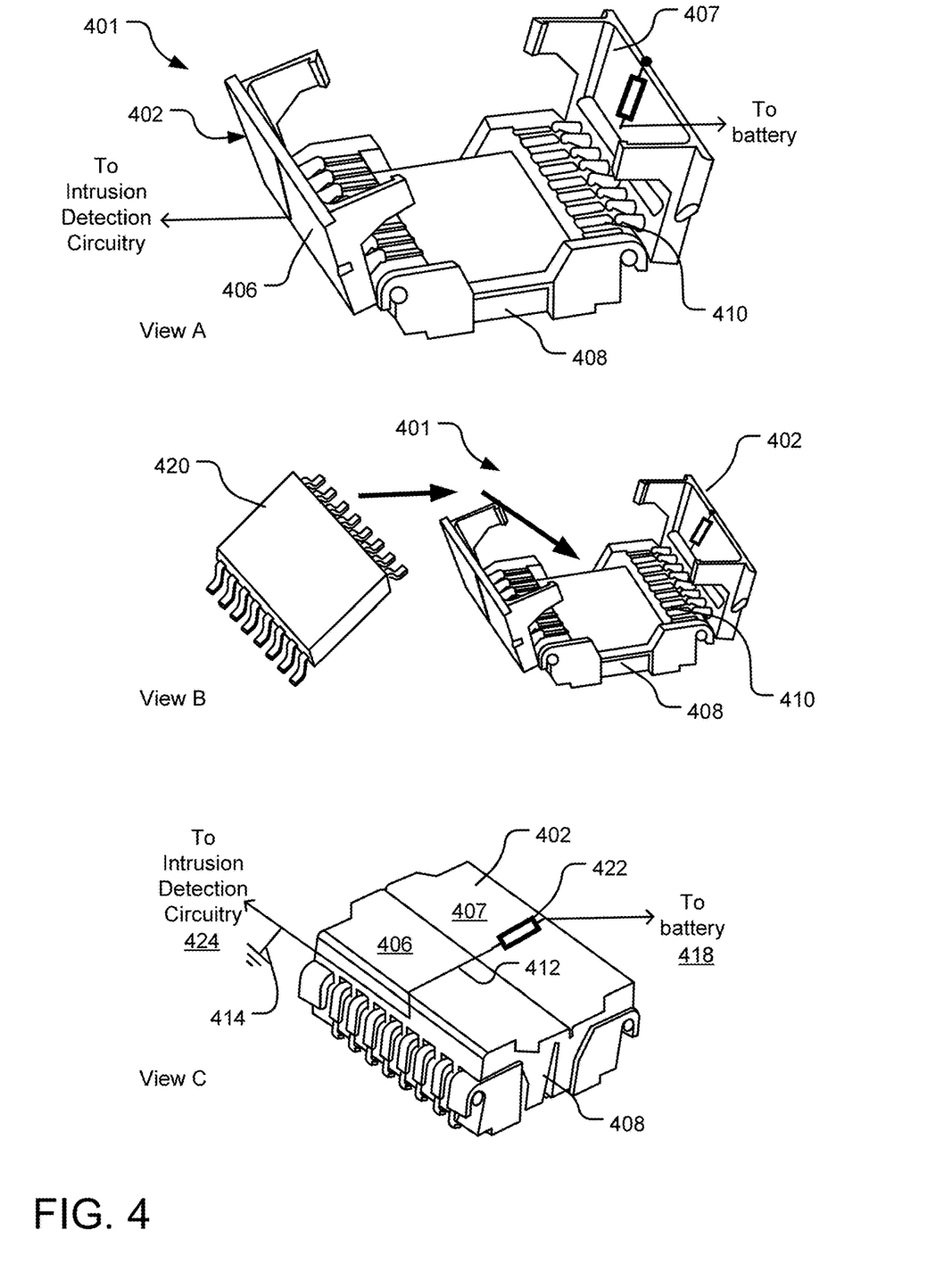
FIG. 4 illustrates aspects of an example intrusion detection mechanism for another type of PCB-mounted component.

FIG. 4 illustrates aspects of another processing device 400 with an intrusion detection mechanism integrated within a flash memory socket 401. The flash memory socket 401 includes a connector 408 and a connector cap 402, shown in detail in View A. The connector 408 is formed in a base portion of the flash memory socket 401 and includes an electrical interface 410 that designed to receive and mate with a memory chip 420 (shown in both of View B and View C). The connector cap 402 is formed in an upper portion of the flash memory socket and includes doors 406, 407 that open and close to provide access to the electrical interface 410 and to the memory chip 420 when it is mated with the connector 408.

View B illustrates the memory chip 420 being inserted into (mated with) the connector 408 of the flash memory socket. Once the memory chip 420 is mated with the connector 408, the doors of the connector cap 402 close around the chip (as shown in View C). Like the connectors of FIG. 1-3, the connector 408 is a PCB-mounted component. Unlike the connectors of FIG. 1-3, the connector 408 has an electrical interface that couples a security sensitive component (the memory chip 420) to a processor internal to the data storage device rather than to a processor external to the processing device.

The intrusion detection mechanism of FIG. 4 includes an electrical pathway 412 that extends through the connector cap 402 across at least a portion of the connector 408. The electrical pathway 412 may include a wire shunt or one or more resistors (e.g., a strong pull resistor 422). When the doors of the connector cap 404 are closed, current flows across the electrical pathway 412 from a power source (e.g., battery 418) to a ground connection 414. In the illustrated implementation, the battery 418 and the ground connection 414 are located on opposite sides of the connector cap 402 and current flowing across the electrical pathway 412 is transmitted laterally, first across the door 407 and then across the door 406 (e.g., crossing from one side of the connector 408 to the other).

It should be understood that the electrical pathway 412 may be either internal or external to the doors 406, 407, and the views of FIG. 4 are intended to be agnostic with respect to this positioning and are drawn such that the electrical pathway 412 is visible in all views (as if the doors 406, 407 are transparent).

Intrusion detection circuitry 424 monitors the voltage at a sampling point on a side of the connector cap 402 that is opposite that of the battery 418, such as at a point adjacent to the ground connection 414. If a user opens the doors on the flash memory socket 401 (as shown in View B) the electrical pathway 412 is disrupted and the voltage drops to zero at the sampling point. This drop in voltage is detected by the intrusion detection circuitry 424, and an intrusion logger (not shown) generates an intrusion detection event in a logfile. Other aspects of the intrusion mechanism not explicitly described with respect to FIG. 4 may be the same or similar to that those described in other implementations herein.

Figure 5:
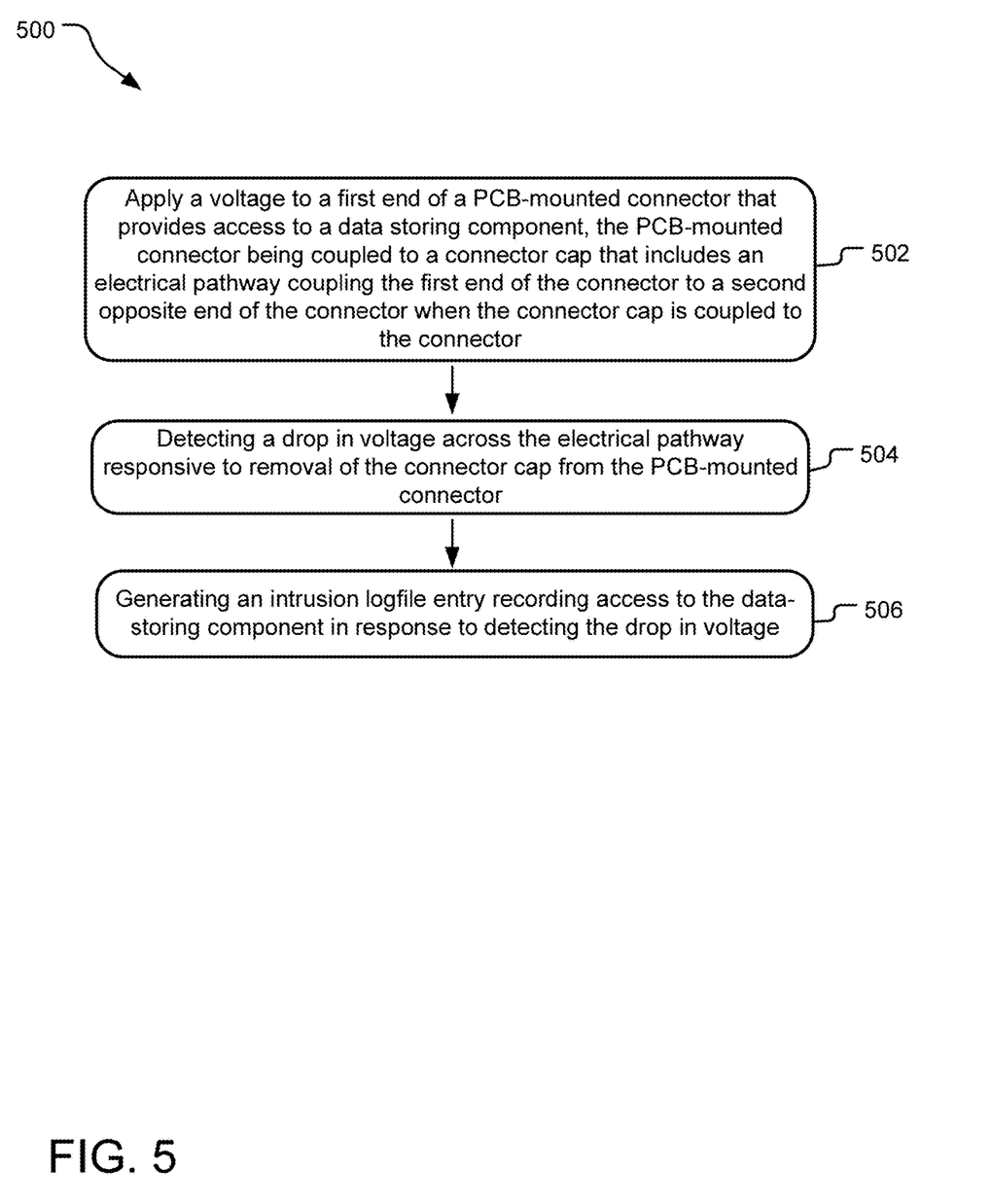
FIG. 5 illustrates example operations for detecting and logging access to a security sensitive component on a PCB in an electronic device that has been deployed in the field.

FIG. 5 illustrates example operations 500 for detecting and logging access to a security sensitive component on a PCB in a device that has been deployed for in-the-field use (post-production and testing). A voltage application operation 502 applies a voltage to a first end of a PCB-mounted connector that provides read/write access to a security sensitive component on the PCB. The PCB-mounted connector is coupled to a connector cap, and the connector cap includes an electrical pathway extending across a portion of the connector cap such that the first end of the connector is electrically coupled to a second opposite end of the connector through the connector cap at all times when the connector cap is coupled to the connector.

A detecting operation detects a drop in voltage across the electrical pathway in the connector cap responsive to removal of the connector cap from the connector.

A logfile entry generation operation creates a new entry in an intrusion logfile response to detecting the drop in voltage resulting from the removal of the connector cap. The intrusion logfile entry may, for example, indicate a timestamp corresponding to the removal of the connector cap. In at least one implementation, the voltage applied to the connector is a battery. In the same or another implementation, the intrusion logfile entry is generated by a microprocessor powered by a device battery or other persistent power source that provides power even when a motherboard of the device is without power (off).

Figure 6:
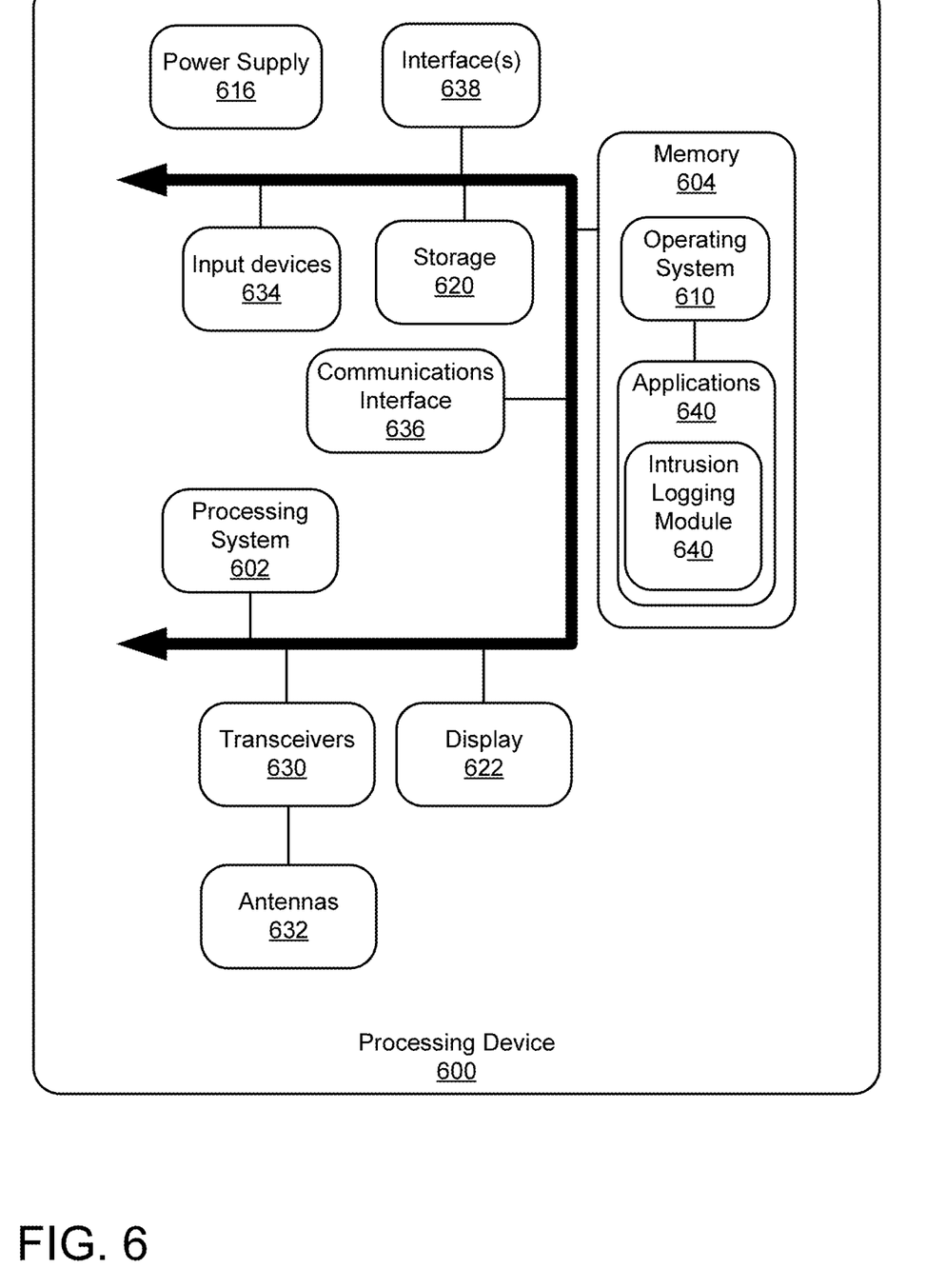
FIG. 6 illustrates an example schematic of a processing device that may be suitable for implementing aspects of the disclosed technology

FIG. 6 illustrates an example schematic of a processing device 600 that may be suitable for implementing aspects of the disclosed technology. The processing device 600 includes a processing system 602 (e.g., a CPU and a USB controller controller), memory 604, a display 622, and other interfaces 638 (e.g., buttons). Components of the processing system 602, memory 604, and the various interfaces 638 may be electrically coupled to a same printed circuit board (PCB, not shown) and each be accessible through a PCB-mounted connector (not shown) that may include a connector cap and/or integrate other aspects of the intrusion detection mechanisms disclosed herein. The memory 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory 604 and is executed by the processing system 602, although it should be understood that other operating systems may be employed.

Applications 640 including an intrusion logging module 642 are loaded in the memory 604 and executed on the operating system 610 by the processing system 602. Applications 640 may receive input from various input local devices (not shown) such as a microphone, keypad, mouse, stylus, touchpad, joystick, etc. Additionally, the applications 640 may receive input from one or more remote devices, such as remotely-located smart devices, by communicating with such devices over a wired or wireless network using more communication transceivers 630 and an antenna 632 to provide network connectivity (e.g., a mobile phone network, Wi-Fi®, Bluetooth®). The processing device 600 further includes storage 620 and a power supply 616, which is powered by one or more batteries and/or other power sources and which provides power to other components of the processing device 600. The power supply 616 may also be connected to an external power source (not shown) that overrides or recharges the built-in batteries or other power sources.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, ROM, electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example intangible communication signals include wired media such as a wired network or direct-wired connection, and wireless media such as acoustic, RF, infrared and other wireless media.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. An intrusion detection system for detecting access to a security sensitive component on a printed circuit board (PCB) within an electronic device, the intrusion detection system comprising:
   a PCB-mounted connector including:
      application pins that provide read/write access to the security sensitive component; and
      intrusion pins that are shorter in length than the application pins;
   a connector cap that mates with the PCB-mounted connector to prevent physical access to the PCB-mounted connector and that provides an electrical path between the intrusion pins, the connector cap including circuitry that facilitates current flow across the PCB-mounted connector when the connector cap is mated with the PCB-mounted connector, the current flow being disrupted between the intrusion pins when the connector cap is removed from the PCB-mounted connector; and
   an intrusion detection controller configured to monitor a voltage at a sampling point adjacent to the connector cap to detect disruption of the current flow between the intrusion pins caused by removal of the connector cap from the PCB-mounted connector and to generate an intrusion logfile entry responsive to detecting a voltage drop at the sampling point.

2. The intrusion detection system of claim 1, wherein the PCB-mounted connector is a debug header.

3. The intrusion detection system of claim 2, wherein the intrusions pins include a first intrusion pin and a second intrusion pin and wherein the connector cap is designed to mate with and provide an electrical path between the first intrusion pin and the second intrusion pin.

4. The intrusion detection system of claim 1, wherein an electrical connection within the connector cap includes a strong pull resistor that limits power consumed by the intrusion detection system.

5. The intrusion detection system of claim 1, wherein the circuitry within the connector cap completes an electrical pathway extending between a first side of the PCB-mounted connector and a second opposite side of the PCB-mounted connector.

6. The intrusion detection system of claim 1, wherein the intrusion detection controller publishes a timestamp in the intrusion logfile entry responsive to detecting removal of the connector cap from the PCB-mounted connector.

7. The intrusion detection system of claim 1, wherein the intrusion detection controller is supported by a reserve power supply of the electronic device.

8. Tangible computer-readable storage media encoding instructions for executing a computer process for logging suspected access to a security sensitive component of an electronic device, the computer process comprising:
   monitoring voltage at a sampling point adjacent to a connector cap on a printed circuit board (PCB) to detect removal of the connector cap from a PCB-mounted connector, the PCB connector including:
      application pins that provide read/write access to the security sensitive component; and
      intrusion pins shorter in length than the application pins;
      and wherein the connector cap includes circuitry that facilitates current flow across the intrusion pins of the PCB-mounted connector when the connector cap is mated with the PCB-mounted connector;
   detecting a drop in voltage at the sampling point when the connector cap is removed from the PCB-mounted connector and the current flow is disrupted between the intrusion pins;
   generating an intrusion logfile entry responsive to detecting a voltage drop at the sampling point.

9. The tangible computer-readable storage media of claim 8, wherein the PCB-mounted connector is a debug header.

10. The tangible computer-readable storage media of claim 9, wherein the intrusion pins include a first intrusion pin and a second intrusion pin and wherein the connector cap is designed to mate with and provide an electrical path between the first intrusion pin and the second intrusion pin.

11. The tangible computer-readable storage media of claim 10, wherein the first intrusion pin and the second intrusion pin are shorter than the application pins.

12. The tangible computer-readable storage media of claim 8, wherein the current flow across the portion of the PCB-mounted connector is along an electrical path within the connector cap, and wherein the electrical path includes a strong pull resistor.

13. The tangible computer-readable storage media of claim 10, wherein the computer process further comprises publishing a timestamp in the intrusion logfile entry responsive to detecting removal of the connector cap from the PCB-mounted connector.

14. An intrusion detection system that detects access to a security sensitive component on an electronic device, the intrusion detection system comprising:

a debug header attached to a printed circuit board (PCB) that provides an electrical interface to the security sensitive component, the debug header including application pins and intrusion pins that are shorter in length than the application pins;

a connector cap that mates with at least a portion of the debug header to prevent physical access to the debug header, the connector cap including circuitry that facilitates current flow across at least a portion of the debug header between two of the intrusion pins when the connector cap is mated with the debug header, the current flow being disrupted between the intrusion pins when the connector cap is removed from the debug header; and an intrusion detection controller configured to:
monitor a voltage at a sampling point adjacent to the connector cap to detect disruption of the current flow between the intrusion pins caused by removal of the connector cap from the debug header; and
generate an intrusion logfile entry responsive to detecting a voltage drop at the sampling point.

15. The intrusion detection system of claim 14, wherein an electrical connection between the intrusion pins includes a strong pull resistor.

16. The intrusion detection system of claim 14, wherein the intrusion detection controller publishes a timestamp in the intrusion logfile entry responsive to detecting removal of the connector cap from the debug header.

17. The intrusion detection system of claim 14, wherein the intrusion detection controller is supported by a reserve power supply of the electronic device.

* * * * *